(12) United States Patent
Shepherd

(10) Patent No.: US 9,323,861 B2
(45) Date of Patent: Apr. 26, 2016

(54) METHOD AND APPARATUS FOR ENHANCED WEB BROWSING

(76) Inventor: Daniel W. Shepherd, Escondido, CA (US)

( * ) Notice: Subject to any disclaimer, the term of this patent is extended or adjusted under 35 U.S.C. 154(b) by 672 days.

(21) Appl. No.: 12/949,685

(22) Filed: Nov. 18, 2010

(65) Prior Publication Data

US 2012/0130970 A1    May 24, 2012

(51) Int. Cl.
*G06F 17/30* (2006.01)

(52) U.S. Cl.
CPC .... *G06F 17/30902* (2013.01); *G06F 17/30864* (2013.01)

(58) Field of Classification Search
USPC .......................................... 707/999.005, 706
See application file for complete search history.

(56) References Cited

U.S. PATENT DOCUMENTS

| | | | |
|---|---|---|---|
| 6,631,369 B1 * | 10/2003 | Meyerzon et al. | |
| 2005/0097160 A1 * | 5/2005 | Stob | 709/200 |
| 2005/0149507 A1 * | 7/2005 | Nye | 707/999.003 |
| 2007/0130125 A1 * | 6/2007 | Holte | 707/999.003 |
| 2007/0288437 A1 * | 12/2007 | Xia | 707/999.003 |
| 2008/0104113 A1 * | 5/2008 | Wong et al. | 707/104.1 |
| 2008/0104502 A1 * | 5/2008 | Olston | G06F 17/30902 715/229 |
| 2009/0119329 A1 * | 5/2009 | Kwon et al. | 707/999.102 |
| 2009/0132524 A1 * | 5/2009 | Stouffer et al. | 707/999.005 |
| 2010/0145956 A1 * | 6/2010 | Shi et al. | 707/754 |
| 2011/0047050 A1 * | 2/2011 | Steelberg | G06Q 30/0641 705/27.1 |

* cited by examiner

*Primary Examiner* — Hung Q Pham
(74) *Attorney, Agent, or Firm* — Mandour & Associates, APC

(57) ABSTRACT

Methods and apparatus for searching the World Wide Web are disclosed. The method includes searching all the pages of at least one web site and then searching at least one search engine index for all the pages of at least one web site and determining if the pages are cached in the search engine index. A further embodiment provides for searching an index of a search engine, repeating the search after a specified period of time and then determining if any changes have been made to the web pages in the search engine index.

3 Claims, 3 Drawing Sheets

METHOD AND APPARATUS FOR ENHANCED WEB BROWSING

BACKGROUND

1. Field

The present disclosure relates generally to web browsing, and more specifically to an enhanced web-browsing program.

2. Background

The World Wide Web has become the preferred research source for all types of information. Rather than visit a library for information, users turn to their computers for retrieving information. However, with this popularity has come information overload. Untold pages of information are stored in web sites. With the rise in Internet use and information searching, automated browsing has become critical.

This automated browsing is called web crawling or spidering. Many sites, such as search engines, use spidering as a means of providing up to date data. In some cases, web crawling is used to automate maintenance tasks on web sites, such as checking links or validating HTML code. However, certain characteristics of the World Wide Web make crawling very difficult, or adversely affect the performance of a web site. These characteristics include: the huge size of the web, the fast rate of change, and dynamic page generation.

The nature of many web crawlers further contributes to the problems noted above. Many web crawlers perform only one or a few tasks at a time, leading to repeated operations in order to accomplish a list of tasks. Repeated crawler operations may be needed to determine if the pages are cached in a search engine index, and these are just a sample of the problems encountered by typical Web crawlers. These actions may cause server problems for the web sites being crawled and slower operations, such as page access, for users.

There is a need for a web crawler that is capable of enhanced operations, including the ability to perform multiple types of searches in parallel.

SUMMARY

A method of searching the World Wide Web using an enhanced web crawler is provided. The method comprises searching all of the pages on a desired web site and then searching at least one search engine index for those web pages, and determining if the web pages are cached in the search engine index.

A further embodiment for searching the World Wide Web provide for searching an index of a search engine web, and then repeating the search of the search engine web site after a period of time. Any differences or changes may be noted.

An apparatus for searching the World Wide Web is also provided. The apparatus includes a processor coupled to a display device, with the processor containing instructions for searching all pages on at least one web site, searching at least one search engine index, and determining if the pages on the web site are cached on the search engine index.

Another embodiment provides an apparatus for searching the World Wide Web. The apparatus includes a processor coupled to a display device, with the processor containing instructions for searching a search engine index, and then repeating the search of the search engine index after a specified period of time, and determining if changes have occurred.

Yet a further embodiment provides an apparatus for searching the World Wide Web. The apparatus comprises means for searching all of the pages on a desired web site and means for then searching at least one search engine index for those web pages, and means for determining if the web pages are cached in the search engine index.

An additional embodiment includes a processor readable medium including instructions for searching all of the pages on a desired web site and instructions for then searching at least one search engine index for those web pages, and instructions for repeating the search of the at least one search engine index after a specified period of time, and instructions for determining if changes have occurred.

Various aspects and embodiments of the invention are described in further detail below.

DETAILED DESCRIPTION

Figure 1:
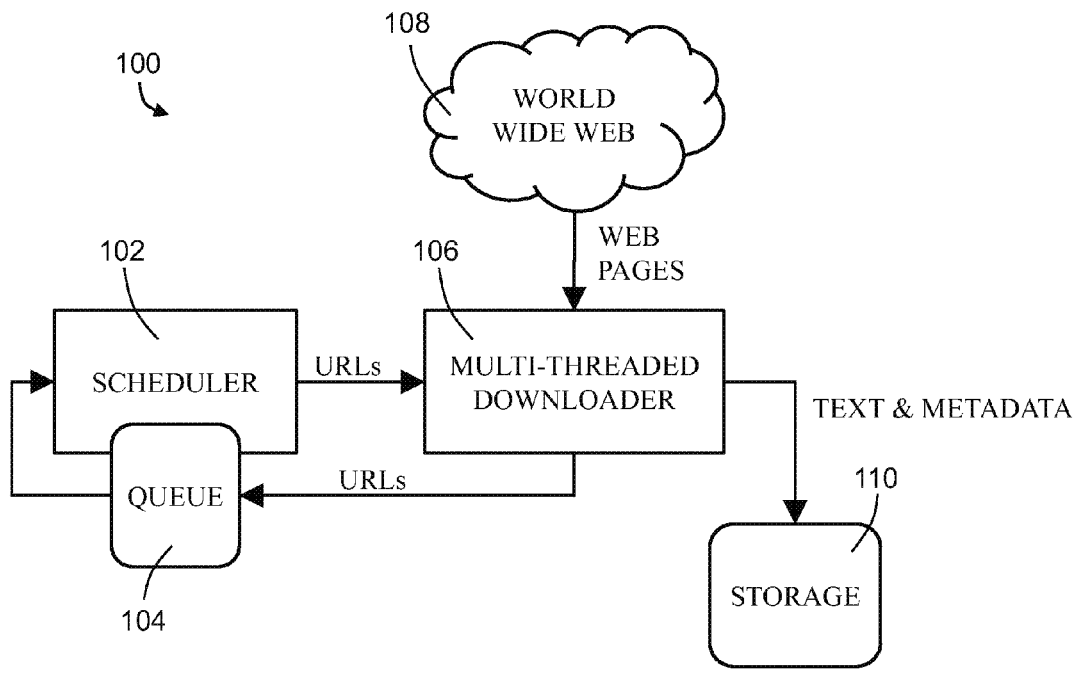
FIG. 1 illustrates the high-level architecture of a web crawler, in accordance with various embodiments of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

A web crawler in general is a computer program designed to browse the World Wide Web in an automated and methodical manner. A web crawler may also be known as an ant, an automatic indexer, a worm, web spider, web robot, or web scutter. The process by which a web crawler performs its tasks is known as web crawling or spidering. It is common for search engines and other sites to use spidering as a method of providing up to date data. Web crawlers are used primarily to create copies of all the pages visited for later processing by a search engine that will then index the downloaded pages to facilitate fast searches. Crawlers may also be used to perform automated maintenance on a web site, such as checking links and validating HTML code. In addition, a crawler may be used to gather specific types of information from web pages, which can include harvesting email addresses.

A web crawler is a type of software agent, or bot. In general, the web crawler begins with a list of Universal Resource Locators (URLs) to visit. These URLs are known as seeds. The crawler visits these URLs and identifies all the hyperlinks in the pages. It then adds these hyperlinks to the list of URLs to visit, known as the crawl frontier. URLs from the frontier may be recursively visited according to a set of policies established when the crawler was initiated.

As noted above in the Background, certain characteristics of the World Wide Web make web crawling very difficult. The World Wide Web has become very large, and grows still larger each day, with ever more sites to be searched. The rate of change in the World Wide Web also causes problems because the change is constant, requiring that web sites be re-crawled on a frequent basis. The World Wide Web's dynamic page generation creates further problems for web crawlers. All of the above characteristics combine to create a very wide array of possible crawlable URLs.

The large volume means that the web crawler can only download a small fraction of the web pages in a given period of time. As a result, a web crawler needs to prioritize the downloads. In addition, the high rate of change of the World Wide Web means that by the time the crawler is downloading the last of the pages from a site, there is a strong possibility that new pages have been added or pages have been updated or deleted.

A further challenge for web crawlers is caused by server-side software and causes the download of duplicate content. There are endless combinations of HTTP GET (URL-based) parameters that exist, and only a small fraction of which will actually return unique content. As an example, consider a small online photo gallery. The gallery may offer three options to viewers, specified through the HTTP GET parameters in the URL. The gallery may also offer four ways to sort the images, three selections for thumbnail size, two file formats, and an option to disable user-provided content. The combination of the various features may result in forty-eight different URLs, all of which may be linked on the site, and must be searched by the crawler. Such permutations force the crawler to sort through an endless combination of relatively minor changes in order to retrieve unique content.

The factors above require the behavior of a web crawler to operate in a scalable, efficient way in order to provide fresh and timely data. This further challenges a web crawler to carefully select which pages to visit next.

The behavior of a web crawler is produced by the outcome of a combination of policies. These policies include a selection policy, which determines which pages to download; a re-visit policy that dictates when to check for changes to pages already examined; a politeness policy that provides guidelines for avoiding overloading web pages visited by the web crawler; and a parallelization policy that dictates coordination of distributed web crawlers.

Because of the huge size of the World Wide Web even a relatively large search will cover only a portion of the publicly available Internet. This factor means that a web crawler download the most relevant pages, and not merely a random sampling.

In order to accomplish this task, a web crawler must prioritize the web pages it reviews. The importance of a web page is a function of its intrinsic quality, its popularity in terms of links or visits, and also of its URL (particularly true for vertical search engines that are restricted to a single top-level domain, or search engineers restricted to a fixed web site.)

It may be preferable for a web crawler to seek out only HTML pages and avoid other types. In order to accomplish this, the web crawler may make a request to determine the type of pages before requesting the entire web page. The web crawler may examine the URL and only request a web page if the URL ends with certain characters. The crawler should also be capable of avoiding certain resources that may trap a crawler into downloading an infinite number of URLs from a website.

Under some circumstances, it may be desirable for a web crawler to download as many resources as possible from a particular web site. This is accomplished by using a path ascending crawler that ascends to every path in each URL that the crawler intends to crawl.

In other circumstances, it may be desirable for a web crawler to engage in focused crawling or topical crawling. In this type of web crawling the importance of a given page for a web crawler can be expressed as a function of the similarity of the page to a given query. This leads to a particular challenge for focused crawler, the need to be able to predict the similarity of the text of a given page to the query before the page is actually downloaded. Once method is to use the anchor text of the links on the page. An alternative method uses the complete content of previously visited pages to infer similarity. The performance of a focused web crawler depends on the richness of the links in the topic being searched. Typically, a focused web crawler relies on a general web search engine to supply a starting point for the web crawl.

A large portion of the web pages in the World Wide Web may be invisible pages. An invisible page is most often a page accessible only by submitting a query to a database. This poses a problem for some crawlers, as those web crawlers are unable to find those pages if there are no links that point to them. This deep web crawling multiplies the number of web links to be crawled.

By it nature, the World Wide Web is very dynamic, and crawling even a small faction of it requires a significant amount of time. During the web crawl, as mentioned previously, pages may be changed, added, or deleted. For a search engine, there is an associated cost with not detecting such events. These cost functions are measured using the metrics of freshness and age.

Freshness is a binary measure that indicates whether the local copy is accurate. The freshness of a page p may be defined as 1, if p is equal to the local copy at time t and 0 otherwise.

Age is a measure of how outdated the local copy is. The age of a page p in the repository, at time t is 0 if p is not modified at time t and t-modification time of p otherwise.

The goal of the web crawler is to keep the average freshness of pages in its collection as high as possible, or conversely, to keep the average age of pages in the repository as low as possible. These objectives are not equivalent. In the first case, the web crawler is only concerned with how many pages are outdated, and in the second case, the web crawler is concerned with the age of the local copies.

In addition, a web crawler may employ a uniform policy. This involves re-visiting all pages in the repository or collection with the same frequency, regardless of the rate of change of the page. In some cases, this may result in visiting an unchanged page.

Another policy that may be employed by a web crawler is a proportional policy. This involves revisiting the pages that change more frequently the pages that often change. This visiting policy is directly proportional to the estimated change frequency.

The crawler should penalize the elements that change too often in order to improve freshness. An optimal revisiting policy is neither purely uniform nor purely proportional. The optimal method to maintain a high value of average freshness includes ignoring pages that change too often. In contrast, the optimal for keeping the average age low is to use access frequencies that monotonically (and sub-linearly) increase with the rate of change of each page. In both cases, the optimal choice is closer to a uniform policy than a proportional policy.

An advantage of web crawlers is their ability to retrieve data faster and in considerably greater depth than human researchers. A downside of this advantage is that this can cripple the performance of a web site. If a single web crawler is performing multiple requests per second and/or downloading large files, a server would be hard-pressed to keep up with multiple requests from multiple crawlers.

One answer to the above dilemma is the parallel web crawler. A parallel web crawler runs multiple processes in parallel. The goal is to maximize the download rate while minimizing the overhead from parallelization and also to avoid repeatedly downloading the same page. To avoid multiple downloads of the same page, the web crawler system requires a policy for assigning new URLs discovered during the crawling process, since the same URL may be found by different crawling processes. As a further means to avoid repeated crawling of the same resource, a web crawler may also perform some type of URL normalization, or URL canonicalization. This process involves modifying and standardizing a URL in a consistent manner. Several types of normalization that may be performed, including converting URLs to lowercase, removal "." And ".." segments, as well as adding trailing slashes to the non-empty path component.

FIG. 1 illustrates the high level architecture 100 of a web crawler according to an embodiment of the invention. The World Wide Web 108 is searched by the enhanced web crawler and web pages are routed to a multi-threaded downloader 106 for download. The multi-threaded downloader routes URLs that have been found to the queue 104. The queue 104 routes the newly located URLs to the scheduler 102 that prioritizes the web pages and sites to be searched by the web crawler. The scheduler 102 routes the schedule of URLs to the multi-threaded downloader 106. The multi-threaded downloader 106 outputs text and metadata to a storage device 106. The process repeats as new areas are located and searched.

Figure 2:
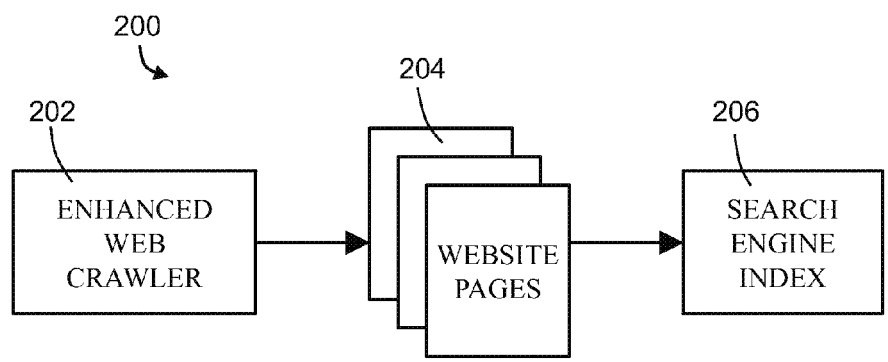
FIG. 2 illustrates one operation of an enhanced web crawler, in accordance with one or more embodiments the present invention.

FIG. 2 illustrates one embodiment of the operation 200 of an enhanced web crawler 202 according to an embodiment of the invention. The enhanced web crawler 202 first searches, or crawls all of the pages on the selected web site 204. Once this has been completed the enhanced web crawler 202 then visits a search engine index 206 such as Google, Yahoo, Bing, or other similar web site and determines if the selected pages are cached on the search engine index.

Figure 3:
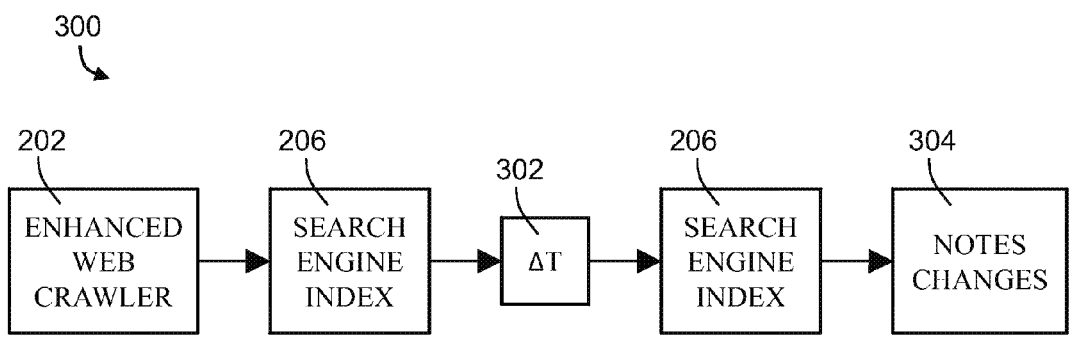
FIG. 3 illustrates a further operation of an enhanced web crawler, according to one or more embodiments of the present invention.

FIG. 3 illustrates a further embodiment of the operation 300 of an enhanced web crawler 202. The enhanced web crawler 202 searches or crawls a search engine index 206 of a site at a particular point in time. A period of time, delta t, 302, is allowed to elapse. Delta time may be any desired increment of time, such as a day or a week. This time may be selected to allow for updates to the selected web pages to occur and promotes freshness. After the elapse of time delta t, the search engine index 206 is again crawled and changes are noted and stored, 304.

Figure 4:
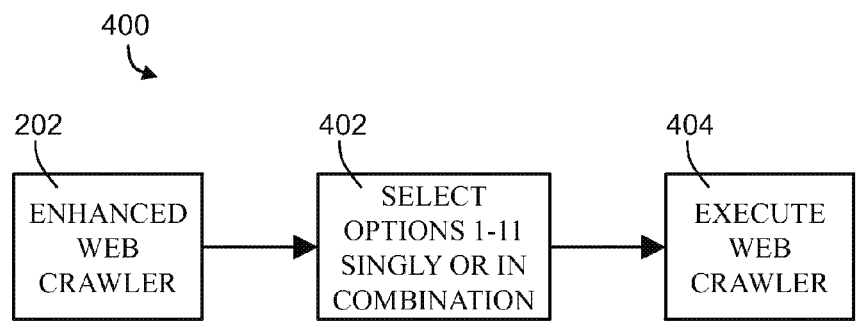
FIG. 4 illustrates additional operations of an enhanced web crawler, in accordance with one or more embodiments of the present invention.

FIG. 4 provides yet another embodiment. The embodiment of FIG. 4 is a parallel web crawler with a variety of search options. The operation, 400 of the enhanced parallel web crawler 202 begins with a user or operator selecting options for the enhanced parallel web crawler 202 to use. The options are selected from the list below:

Crawl all pages on a web site and then search a search engine and determine if each page is cached in the search engine index.

Crawl a search engine index at a specific point in time, return later, and determine if changes have occurred.

Crawl a web site and determine all anchor text links, internal links, external links, and display all of these items in one report.

Crawl a web site and find a broken link.

Crawl a web site and find all leading links.

Crawl a web site and show all external links.

Crawl a web site and show all image links.

Pull a type of data (specified at time of search) from a web site.

Copy and index the source code of an entire web site, and store that source code in the same file structure.

Block directories, pages, and other sections of a web site during a search.

Choose to select only static, as opposed to dynamic pages on a web site.

The options selected from the list may be performed in any combination and at the same time. Once the options have been selected the search, or web crawl is executed, 404.

Figure 5:
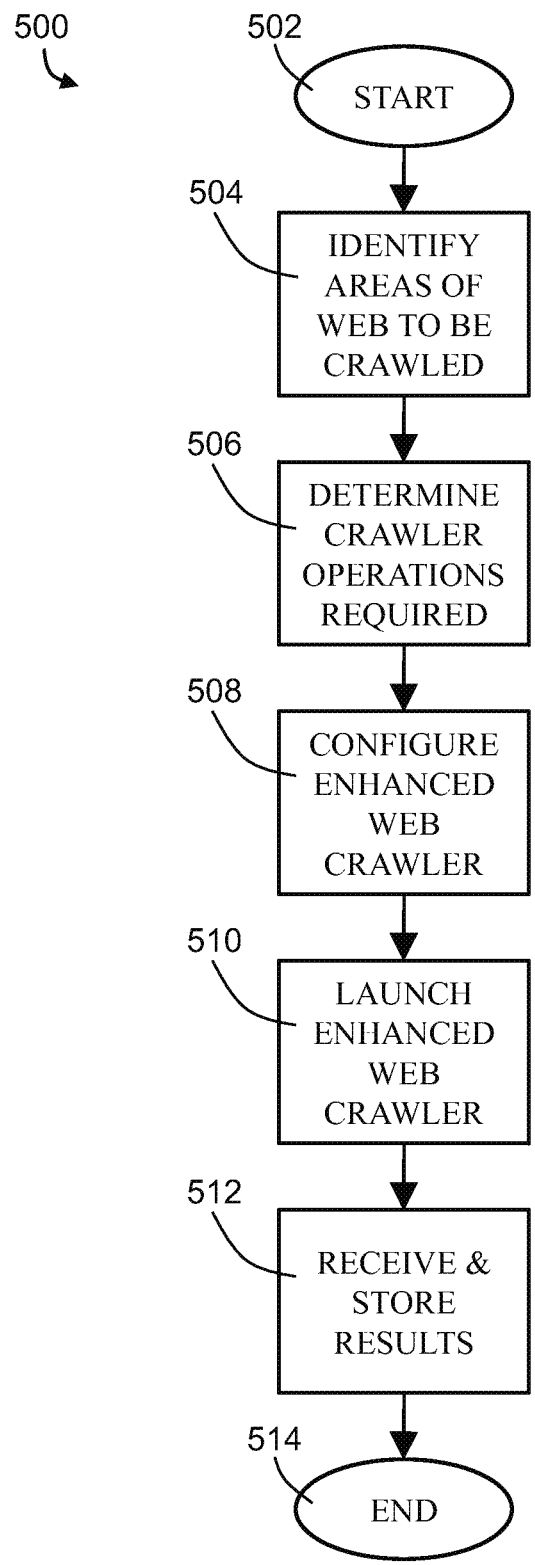
FIG. 5 is a flowchart of the operation of an enhanced web crawler, in accordance with one or more embodiments of the present invention.

FIG. 5 illustrates a process, 500, of the operation of the enhanced web crawler. The process begins at the START, 502. The user first identifies the areas of the World Wide Web to be crawled in step 504. Next, the user determines which crawler operations, from the list above, are required for the selected area. This action occurs in step 506. The enhanced web crawler is configured with the selected operations in step 508. Upon configuration, the enhanced web crawler is launched, step 510, and the search begins. Results are reported back and are stored or cached, step 512. The process ends at step 514, with a completed crawl and stored results.

The web search techniques described herein may be implemented by various means. For example, these techniques may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the web search techniques may be implemented with instructions (e.g., procedures, functions, and so on) that perform the functions described herein. The instructions may be stored in a memory and executed by a processor. The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus for searching at least one web site, comprising:
a processor coupled to a display device, the processor containing instructions for a web crawler, wherein the web crawler comprises a parallel web crawler comprising the following operations:
1) searching all pages on the at least one web site;

2) searching at least one search engine index for said all pages on the at least one web site;
3) determining if said all pages on the at least one web site are cached on the at least one search engine index;
4) repeating the searching of the at least one search engine index after a specified period of time, and determining what changes have occurred;
5) determining, from the at least one web site, all anchor text links, internal links, and external links, and displaying the anchor text links, internal links, and external links in a report, wherein the anchor text links are used to predict the similarity of a page to a query before the page is downloaded, wherein the predicting of the similarity is based on the anchor text links and the predicting allows the processor to engage in focused crawling;
6) searching the at least one web site for broken links;
7) searching the at least one web site for leading links;
8) searching the at least one web site for external links;
9) searching the at least one web site and displaying all image links;
10) extracting a specified type of data from the at least one web site;
11) copying and indexing source code from the at least one web site;
12) blocking directories, pages, and sections from the at least one web site during a search; and
13) selecting only static pages to search on the at least one web site, wherein the web crawler is executed with these thirteen operations being selected;

wherein each of these thirteen operations, starting at the searching all pages on the at least one web site, are run in parallel, wherein the web crawler results in up to date data for said all pages, the web crawler results in gathering information from said all pages, and the web crawler results in automated browsing and maintaining of links and HTML code for the at least one website, the processor further comprising a politeness policy that provides guidelines for avoiding overloading web pages of the at least one web site revisited by the web crawler, wherein the politeness policy is based on Universal Resource Locator (URL) normalization or URL canonicalization of at least one URL of the at least one web site;

the processor further comprising a re-visit policy that dictates when to check for changes to pages of the at least one web site already examined, wherein the revisit policy comprises a combination of uniform and proportional policies that monotonically and sub-linearly increase with rate of change, wherein the revisit policy comprises a binary measure that indicates whether a page of the at least one web site is accurate, wherein the revisit policy comprises a measure of how outdated the page is, wherein the revisit policy maintains a high value of average freshness by ignoring pages of the at least one web site that change to often;

the processor further comprising a selection policy searching all pages on the at least one web site, wherein the using of the anchor text links to predict the similarity of the page is based on the selection policy;

the processor further comprising a parallelization policy for these thirteen operations, wherein coordination of these thirteen operations is based on the parallelization policy.

2. The apparatus of claim 1, wherein said predicting the similarity of the page to the query before the page is downloaded is based on a previously visited page.

3. The apparatus of claim 1, wherein the specified type of data from the at least one web site comprises only HTML pages and avoids other types.

* * * * *